Figure 1:
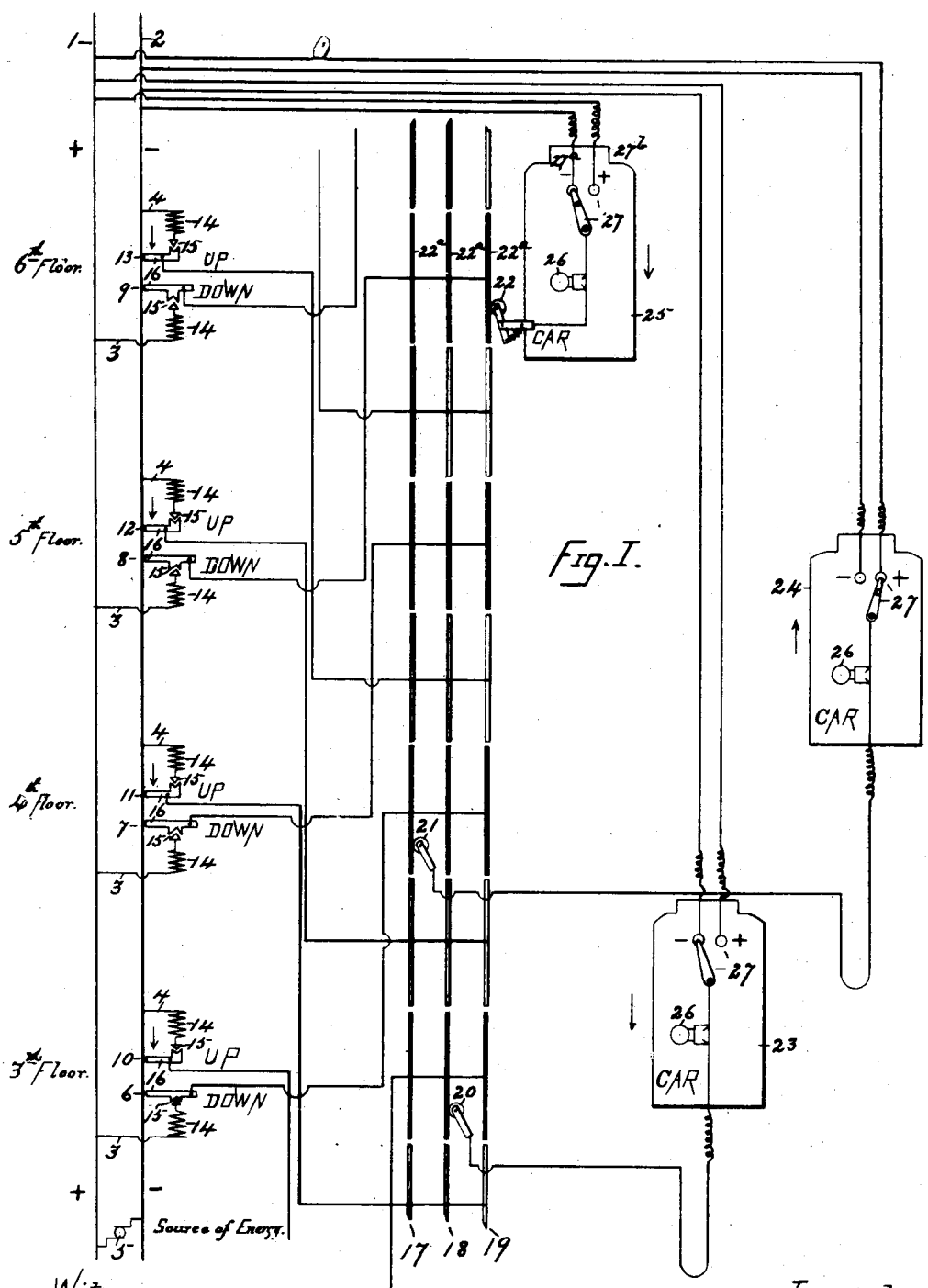

No. 711,202. Patented Oct. 14, 1902.
F. K. FASSETT.
ELECTRIC SIGNALING SYSTEM.
(Application filed June 13, 1898.)
(No Model.) 3 Sheets—Sheet 1.

Fig. I.

Witnesses:
Inventor:
Francis K. Fassett.
By Wellington Adams.
Atty.

No. 711,202. Patented Oct. 14, 1902.
F. K. FASSETT.
ELECTRIC SIGNALING SYSTEM.
(Application filed June 13, 1898.)
(No Model.) 3 Sheets—Sheet 2.
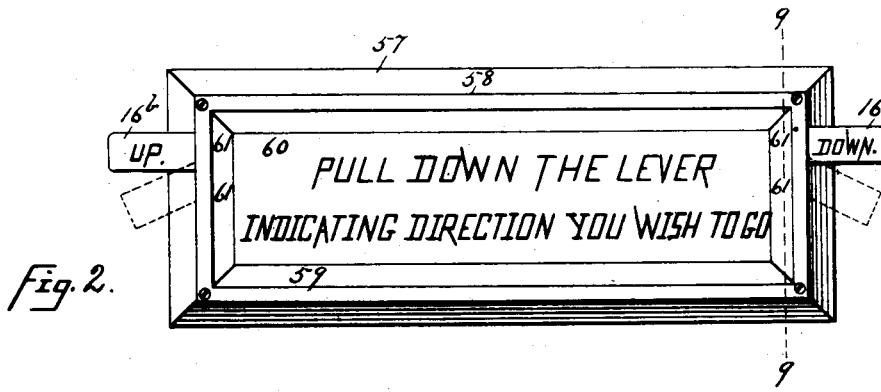
Fig. 2.
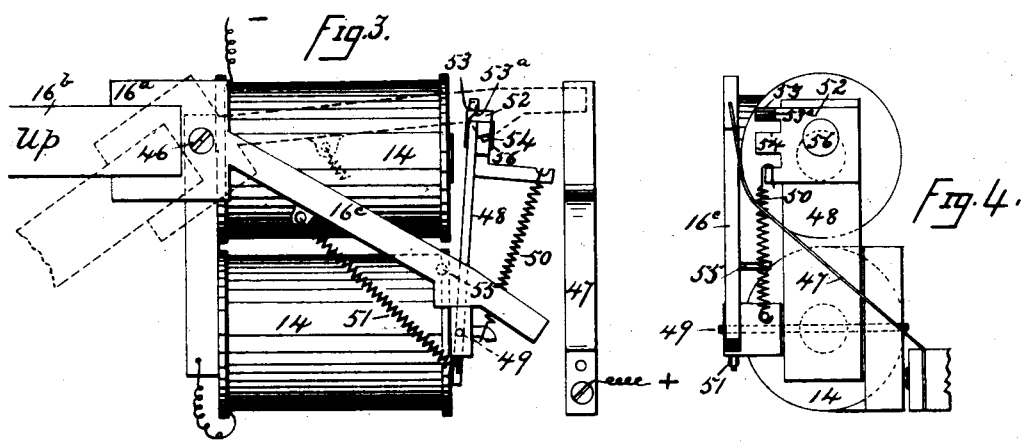
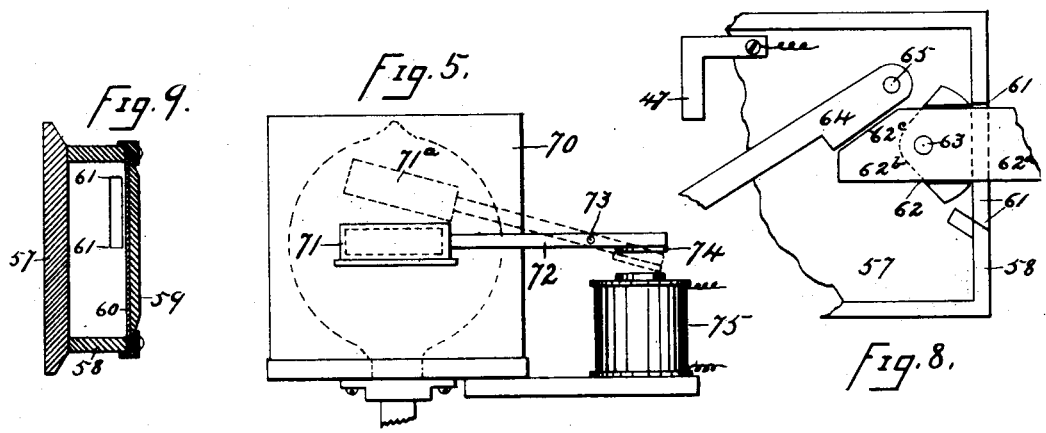
WITNESSES:
Leo Ohrlich
D. G. Seaton
INVENTOR:
Francis K. Fassett.
By Wellington Adams,
Atty.

No. 711,202. Patented Oct. 14, 1902.
F. K. FASSETT.
ELECTRIC SIGNALING SYSTEM.
(Application filed June 13, 1898.)
(No Model.) 3 Sheets—Sheet 3.
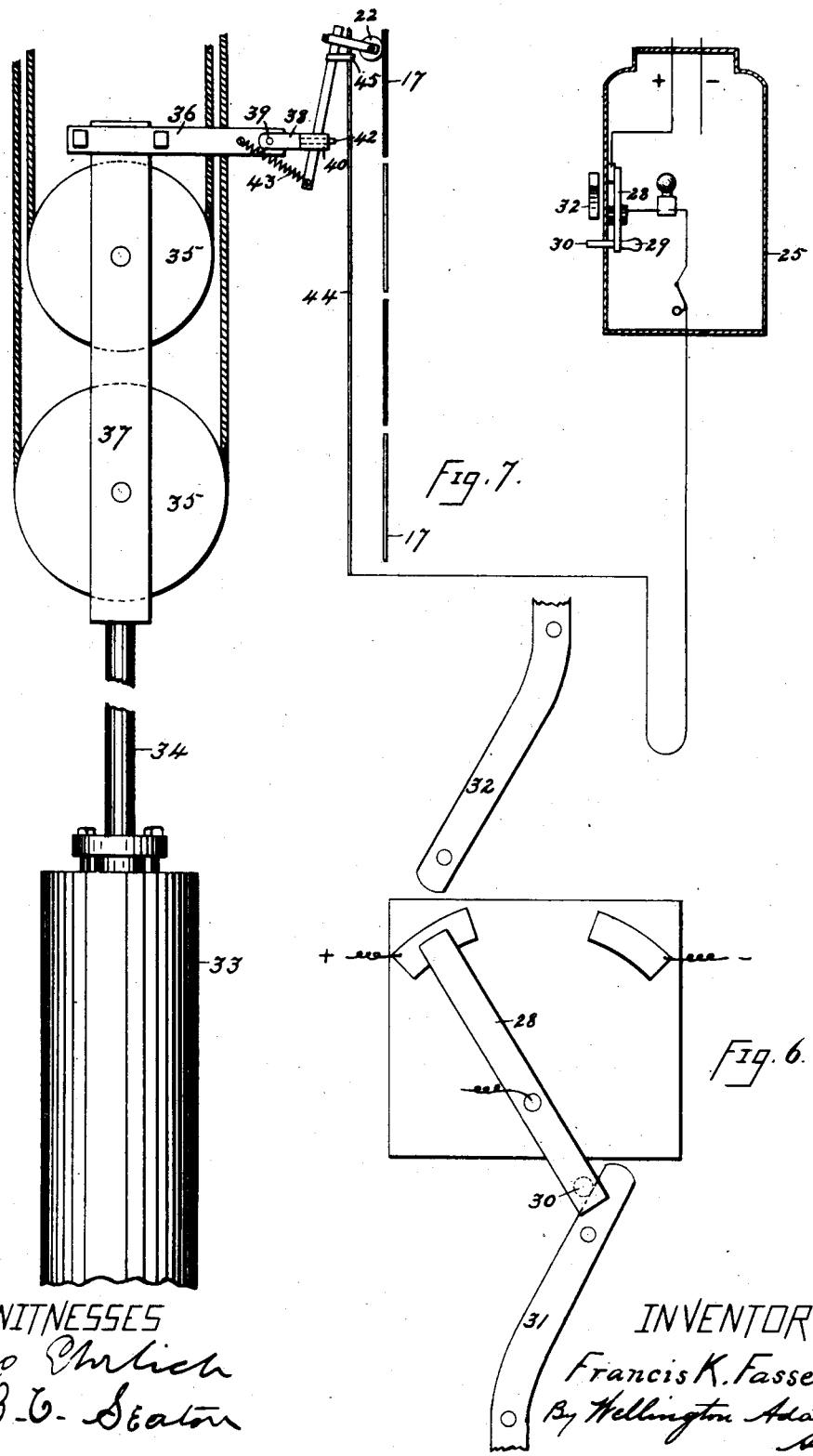
WITNESSES
INVENTOR:
Francis K. Fassett
By Wellington Adams
Atty.

UNITED STATES PATENT OFFICE.

FRANCIS K. FASSETT, OF ST. LOUIS, MISSOURI, ASSIGNOR, BY MESNE ASSIGNMENTS, TO ELEVATOR SUPPLY & REPAIR COMPANY, OF CHICAGO, ILLINOIS, A CORPORATION OF ILLINOIS.

ELECTRIC SIGNALING SYSTEM.

SPECIFICATION forming part of Letters Patent No. 711,202, dated October 14, 1902.

Application filed June 13, 1898. Serial No. 683,293. (No model.)

*To all whom it may concern:*

Be it known that I, FRANCIS K. FASSETT, a citizen of the United States, residing at the city of St. Louis, in the State of Missouri, have invented certain new and useful Improvements in Electric Signaling Systems for Elevators; and I declare the following to be a full, clear, and exact description of the same, reference being had to the accompanying drawings, of which there are three sheets, and to the reference-numerals marked thereon.

This invention relates particularly to improvements in electric signaling systems for elevators and the arrangement of their circuits; and the objects are, first, to provide a system which will be simple and at the same time thoroughly effective; second, to provide a system which will consist of devices involving uniform and positive action and which will at the same time cost but little to operate and maintain; third, to provide a signaling system that will be specially adapted for operation from the ordinary electric-light mains or electric-lighting system of the building in which such signaling system is located without the use of either storage batteries or special generating-batteries or dynamo-electric machinery, such as is required for the successful operation of all other similar signaling systems.

With these objects in view and believing that practical experience has shown it to be essential only that the operator of the elevator which is moving in the desired direction should alone receive a signal in time to stop at the floor from which the signal emanates I provide simply a series of either visual or audible electric signals for the elevators, preferably located in the elevator-cars, and a series of circuit-closing electric switches or signaling-keys of special and novel design in arrangement and details of construction at each floor (one set for "up" signals and one set for "down" signals) in conjunction with a special and novel arrangement of circuits and moving contacts for connecting the said visual or audible signals and the said signaling-keys with each other and with a source of supply of electric energy whenever required, and the arrangement being such that an intending passenger is enabled to set a signal which will be received by or given to the first elevator-car moving in the desired direction which arrives within a certain predetermined distance of the floor on which the intending passenger stands, which distance is sufficient to enable the conductor or operator of the car to stop his car, the same being effected by the manipulation of a push-button, or preferably of a lever forming a part of the signaling key or switch, which is located at the floor from which the intending passenger desires to depart.

I am aware that there are some other elevator signaling systems which upon first appearance it might seem practical to operate from the ordinary electric-lighting system of the building employing the customary voltages of fifty or one hundred and ten volts; but practical experience has proved that when these systems are so operated they constantly get out of order and prove unsatisfactory and very costly to maintain. The difficulty principally arises from making and breaking the circuit under these high voltages with the mechanism employed in the existing systems for making and breaking the circuit for the production and extinguishing of the signal. Under existing systems the circuit is made and broken so slow that there results a destructive spark. By reason of the employment of a rectilinear sectional conductor composed of comparatively long sections well separated from each other by a considerable distance in conjunction with a rectilinearly-movable contact device at which point in my system the said making and breaking occurs I avoid these difficulties, owing to the contact device moving at a greater speed, and thus breaking the circuit more rapidly, and I am for this reason, principally, enabled to operate my signaling system from the ordinary electric-lighting system of the building no matter what may be its voltage or character. Again, under my system a distinct and easily-discernible and conspicuous visual signal is given to the intending passenger, which first notifies him that he has properly set the signal and afterward notifies him that the signal has been received by an elevator.

This is effected by employing a lever moving in a vertical plane, as the actuating mechanism of the signaling-switch, instead of a push-button. Such a lever has considerable extent of movement, and this movement being in a vertical plane it is easily observable when it has been displaced from its normal position and set for a signal, and it is also easily observed when it afterward returns to its normal position by reason of the signal having been received.

It is manifest that it is a great advantage for an intending passenger when stepping up to an elevator to be able to readily and quickly determine if a signal has been set for an elevator moving in the desired direction, and it is also equally desirable for such intending passenger to know that his signal has been received.

Another advantage resulting from my system consists in the fact that by it the "starter" or the manager of the building is enabled to detect when an operator of an elevator fails to go to the extreme limit of the prescribed "run," for if he does not do so, and thus operate the pole-changing switch, the mechanism for the operation of which is located at both ends of the run, such failure can be determined by the fact that the wrong signal will then be given, as will be apparent on reading the description of my system.

While it is not essential that under this system the pole-changing switch should always be operated at the extreme ends of the run only, yet I prefer this arrangement for the reasons stated.

In the accompanying drawings, illustrating my invention, Figure 1 is a diagrammatic representation of my system, showing four floors each with its "up" and "down" signaling-keys, three elevator-shafts each provided with a sectional electric conductor, three elevator-cars carrying their respective electric signal devices, pole-changing switches, and moving contacts and connecting-circuits, and the arrangement of the circuits connecting all with the source of electric energy. Fig. 2 is a front elevation of the retaining box or case which incloses an "up" and a "down" signaling-key or switch, such as is placed at each floor. Fig. 3 is a front elevation of one of the signaling-keys or switches with the contact or switch lever shown in full lines in its normal position, ready to be actuated to set a signal, and shown in dotted lines in the position which it assumes when it is set for the transmission of a signal. Fig. 4 is an end view of the right-hand or armature end of Fig. 3, showing the armature and escapement mechanism for holding the switch-lever in the signaling position until the signal is completed and for releasing the said lever of the signaling-key or switch and allowing it to return to its original or normal position after the signal has been received by the elevator-car and ceased. Fig. 5 shows one form of visual signal which may be used in conjunction with a continuously-burning lamp in lieu of a flash-lamp or which may be used in conjunction with a flash-lamp to constitute a visual electric signal for my system. Fig. 6 shows the pole-changing switch carried by each elevator-car and the arrangement of a pair of reverse inclined planes permanently fastened or stationarily located at the top and bottom of the elevator-shaft or at any other desired point in close proximity to the course or path of travel of the elevator-car and designed to automatically operate said pole-changing switch at the end of each run of the elevator-car or whenever the direction of said car is changed. Fig. 7 represents a modification of my system in which the moving contact is carried by the moving piston or sheaves which actuate the elevator, which latter may be located either horizontally in the basement or upon some other floor of the building in which said elevator is located or vertically in the said building, the said moving contact being thus arranged to move synchronously with the elevator-car actuated by the said piston or sheave instead of being carried directly by the said car, in which case the moving contact is electrically connected with the elevator-car in any well-known manner by means of either a flexible cable or a continuous conductor and a moving contact, or by both the latter combined, as shown in said Fig. 7. Fig. 8 represents a modification in the details of construction of the signaling key or switch for my system in which the switch mechanism is formed of two parts, consisting of an actuating-lever which protrudes through the retaining case or box of the switch and serves alone as the means for manually actuating the switch mechanism and a separate contact-lever contained wholly within the said retaining-case and serving solely and directly to make and break the switch-contact, the former lever engaging with and actuating the latter and capable of movement independent of the latter whenever and so long as the latter or contact lever is set for a signal. In this case the actuating-lever is preferaly formed wholly of some insulating material, such as fiber or hard rubber. Fig. 9 is a cross-section of the retaining case or box of the signaling key or switch, taken on the dotted line 9 9 of Fig. 2.

Similar reference-numerals throughout the several figures represent corresponding parts.

In the drawings, 1 and 2 respectively represent the positive and negative sides of an electric circuit or source of electric energy established in the elevator-shaft or at some other convenient place and connected by branch wires 3 and 4 at each floor with the "down" and "up" signaling-keys, respectively, on the corresponding floors, the positive wire or side of the source of energy being connected with all the "down" keys and the negative wire or side of the said source of energy with all the "up" keys, or vice versa. The said circuit-wires 1 and 2 are supplied with a current of electricity from any desired source, as by battery or by dynamo-electric machine, (represented at 5.)

The numerals 6, 7, 8, and 9 represent "down" and the numerals 10, 11, 12, and 13 represent "up" keys on the different floors, which latter are marked, respectively, "third," "fourth," "fifth," and "sixth" floor.

14 represents an electromagnet, forming a part of each key.

15 represents the electrical contact-points of the switch, which are brought in contact when the actuating-lever 16 in said Fig. 1 of any signaling-key is pulled down for the purpose of setting a signal for an elevator-car.

17, 18, and 19 are stationary bare electric conductors placed vertically in the elevator or machinery shaft, or horizontally in the basement, or upon some other floor and arranged parallel with either the moving piston or sheave which actuates the elevator-car, or parallel with the movement of the elevator-car itself, there being one such sectional electric conductor for each elevator-car. These electric conductors consist of successive sections of any desired length insulated from each other; but I prefer that each section be of sufficient length to permit the moving contact or trolley-wheel to travel on such section during the time the car to which said moving contact is attached or with which it is moving synchronously is traversing half the distance from one floor to the next, thus providing two sections of such conductor for each floor, as shown in Fig. 1, and these sections are connected alternately to the "up" and the "down" signaling keys, all of the conductors for the several elevators corresponding to a given section being connected with the proper key for said section, as shown in Fig. 1. The moving contacts or trolley-wheels are marked 20, 21, and 22, the latter being shown as mounted on and carried by an elevator-car, and 20 and 21 being shown simply as electrically connected with their respective cars 23 and 24, it being intended to here represent that they move synchronously with the cars, either by being attached directly thereto or by being attached to the moving piston or sheave which actuates the elevator-car, as shown in Fig. 7. The elevator-cars in Fig. 1 are represented at 23, 24, and 25. The audible or visual electric signals are represented at 26, and 27 represents a pole-changing switch carried by each elevator-car and arranged so as to be operated either by hand or automatically on the arrival of the car at the bottom and at the top of the elevator-shaft or upon change in the direction of the movement of the said car in any well-known manner, the preferred manner being shown in Figs. 6 and 7, where 28 represents the lever of the pole-changing switch; 29, a handle for the said lever, which projects through the car at 30, so as to engage with stationary reverse incline planes 31 and 32, adapted to shift the lever 28 at both ends of the run of the elevator-car.

In Fig. 7, 33 is the elevator-cylinder; 34, its piston; 35, the sheaves; 36, an arm attached to the sheave-carrying frame 37; 38, an auxiliary arm pivoted at 39; 40, a sleeve formed in one with or attached to the trolley-arm 41 and journaled on the pin 42, so as to allow of lateral movement of the trolley-arm; 43, a spring for keeping the trolley-wheel in contact with the sectional conductor 17; 44, a bare continuous conductor; 45, a spring-sliding contact contacting with the conductor 44; 22, the trolley-wheel; 17, a rectilinear sectional bare electric conductor, the various sections of which are connected to the signaling-keys and source of energy in the manner shown in Fig. 1.

In Figs. 3 and 4, 16 is the contact-lever of the signaling key or switch connected with one side of the circuit and arranged to move in a vertical plane; 46, its fulcrum; $16^a$, the actuating-arm of said lever, which has attached to it a strip of insulating material, such as fiber or hard rubber $16^b$, which latter projects through the inclosing casing or box of the switch, as shown in Fig. 2. $16^c$ is the electric contact-arm of said lever, which serves to make and break the electrical connection of the switch by being thrown in contact with and out of contact with the contact switch or plate 47, which is in electrical connection with the opposite side of the circuit in which the switch is placed; 14, the electromagnet of the switch; 48, its armature; 49, the pivotal or fulcrum point of said armature located at one end of the armature; 50, a spring for returning the armature to its normal position away from the poles of the magnet after a signaling impulse which energizes the magnet has ceased and the said magnet has become demagnetized; 51, a spring for returning the contact-lever to its normal position, as shown in full lines, out of contact with the contact-strip 47 after a signal has been transmitted and ceased; 52, the escapement mechanism carried by one extremity of the armature; 53, one ledge or detent of the said escapement mechanism, and 54 the other ledge or detent of said escapement mechanism; 55, a pin carried by the contact-lever for engagement with the said escapement mechanism; 56, a copper rivet which serves the double purpose of fastening the escapement mechanism to the armature and of preventing the latter from sticking to the poles of the electromagnet by reason of residual magnetism.

In Fig. 2, 57 is a marble or slate base for the retaining case or box of the switch; 58, a rectangular frame for said case; 59, a beveled glass front for said case; 60, a direction-plate for said case located behind the said glass front. At 61 there is a slot in the said case or box for the projection or protrusion through said case of the actuating end or arm of the contact-lever, which in said Fig. 2 is shown at $16^b$ and marked with the word "up."

In Fig. 8, 62 is the actuating-lever, formed, preferably, of fiber or hard rubber and fulcrumed within the retaining case or box at 63 and having one end or arm 62ª projecting through the slot 61 to the outside of the said retaining case or box, one side of which latter is shown in this figure at 58, and the other end or arm of said lever 62ᵇ contained within said case and arranged to engage with and actuate the contact-lever proper at the point 62ᶜ. 64 is the contact-lever proper, contained wholly within the said retaining case or box and fulcrumed at 65.

Having fully described the various parts of my system and the mechanism therefor, its operation is as follows: Suppose an intending passenger upon the fifth floor desires to take a descending elevator-car. Such passenger will pull down the protruding end of the "down" lever of the signaling-key or switch located at such floor. This connects the positive side of the source of energy with the sections 22ª of the sectional conductors 17, 18, and 19, Fig. 1. Then when the first car moving in the proper direction and approaching said floor after the setting of said signaling-switch—as, for instance, car 25 in Fig. 1—reaches the said section 22ª the moving contact 22, carried by said car or moving synchronously with said car, will complete the connection between said source of energy and the signal device for said car, the pole-changing switch 27 for said circuit having been set when the car reached the limit of its upward movement, so as to connect with a wire, as 27ª, which connects with the negative side of said source of energy through a flexible wire or a moving contact contacting with a continuous conductor in the well-known manner for electrically connecting a moving body with a stationary body. When the switch-lever of the "down" key is thus pulled down, the pin 55, Figs. 3 and 4, carried by the other arm of the said switch-lever, will in its upward movement engage with the inclined surface 53ª of the detent or ledge 53 of the escapement mechanism, pushing the same and the armature which carries it slightly inward and toward the poles of the electromagnet 14, and thus pass over and rest upon the upper surface of said detent or ledge 53, the armature having in the meantime sprung back to its normal position, so as to allow the upper surface of said detent or ledge 53 to thus engage with the pin 55. This holds or retains the switch-lever in the position for signaling until the said pin 55 is released from said detent 53 by the reception and cessation of the signal, which latter is effected in the manner hereinafter to be described. After having thus set the signaling-key when the moving contact 22, Fig. 1, of the downwardly-approaching car 25 reaches the upper end of the section 22ª of the sectional conductor 19 an electric circuit is established through the signal device 26 for the car 25 and the electromagnet 14 included in the circuit. This causes the armature 48, Figs. 3 and 4, to be attracted by said electromagnet, and thus allows the pin 55, carried by the switch-lever, to drop down slightly and rest upon the inclined ledge or detent 54 of the escapement mechanism, the switch-contact and signal-circuit being still maintained. Then when the moving contact 22 passes off of the section 22ª of the conductor 19 the circuit is broken at this point, the energizing-current and resulting signal cease, the electromagnet 14 of said circuit and signaling-switch is demagnetized, the armature for said magnet returns to its normal position by the action of the spring 50, and in so doing the pin 55, carried by the switch-lever, is disengaged from the ledge or detent 54 and the switch-lever is allowed to return to its normal position through the action of the spring 51, when said switch-lever is ready to be reset for another signal. It will be readily seen that under this arrangement no "up" signals can be received by the downwardly-moving car 25, since all the "up" switches or signal-keys are connected with the negative side of the source of energy, and the pole-changing switch for said car 25 is set to also connect at the other end of the circuit with the negative side of said source of energy. Thus no circuit will be established for a "down" signal or for any downwardly-moving car by setting an "up" signaling key or switch. The pole-changing switch is set in the desired direction either by hand or automatically by the movement of the elevator, preferably in the latter manner, and this is accomplished by the two reversed inclined planes 31 and 32, (shown in Fig. 6,) the inclined plane 31 being stationarily located at the lower end of the desired run for the elevator-car and the reverse inclined plane 32 being similarly located at the upper end of said run in such manner as to engage with and throw the lever of the pole-changing switch to one or the other side, so as to connect with either the negative or positive side of the source of electric energy, the lever of the pole-changing switch and the two said sides of the circuit being carried by the elevator-car and the said lever being adapted to engage with said fixed inclined planes through the agency of the pin or rod 30, formed, preferably, of some insulating material or in any other suitable manner. It will be observed that in this system when any two elevator-cars going in opposite directions pass each other, the moving contacts for said cars being at such times upon the same section of the sectional conductor, a circuit will be established and a current sent through the signal devices for both of said cars independent of the signaling-keys or switches, the signal devices for the two said cars being at such times placed in circuit in series with each other, because the downwardly-moving elevator and its moving contact are connected with one side of the source of energy and the upwardly-moving car, with its moving contact, is connected with the other side of said source of energy. It may appear from this that there would at such times result what might be called "false signals," particularly when electric lamps are used as signal devices. The elevators are, however, at such times moving in opposite directions, and when they are so moving at normal or natural speed the contact is established for so short a period of time and the current therefore flows for so short a period of time that it does not have an opportunity to heat up the filament of the lamp to that degree of incandescence which is necessary for a practical signal. It is therefore only occasionally—when, for instance, the elevators are moving more slowly than is customary—that currents thus flowing through the signal-lamps will produce any observable signal. I, however, prevent such false signals from occurring by so adjusting the resistances of the electric signal devices or their circuits with respect to the electromotive force of the energizing-current that the current passing through the signal devices at such times will be too small to effectively operate either of the said signal devices when so coupled in series, so that in case an electric lamp is used as the signal device, as is preferable, the signal-lamp will not reach a sufficient degree of incandescence to make an observable signal when two such signal-lamps are connected in series, as is the case when such false signals are given. When using incandescent lamps alone as signal devices, I further obviate this difficulty by coloring or darkening the bulbs or globes for said lamps, so that the small degree of incandescence caused by the electrical impulse at such times will be practically unobservable. In case an electromagnetic signal device is employed, such as is shown in Fig. 5, the electrical adjustment may be such that the current flowing at such times will be wholly insufficient to operate the electromagnetic mechanism and give the signal. In this latter form of signal, (shown in Fig. 5,) 70 is an opaque box or case, which incloses a lamp which may be placed in the signal circuit or which may be separately and continuously energized; 71, a movable shutter covering a corresponding slot or opening in said case; 72, a lever fulcrumed at 73 and carrying said shutter at one extremity and an armature 74 at the other extremity; 75, an electromagnet placed in the signal-circuit for attracting said armature, and thus actuating said shutter. The operation is obvious. When a current sufficiently strong passes through the electromagnet 75, the latter attracts the armature 74, and thus throws up the shutter 71 into the position indicated by the dotted lines 71ª, thus exposing the light contained within said opaque case and giving the signal. It is manifest that the electrical and mechanical adjustment of this electromagnetic mechanism may be such as to render the same wholly inoperative when any two such mechanisms are in the same circuit in series with each other in the manner heretofore pointed out, while being operative when but one such mechanism is included in the circuit. Such a signal device may be used in connection with my system as heretofore described, if thought desirable, to more fully meet the conditions peculiar to this system.

Having now fully described my invention and its operation, what I claim, and desire to secure by Letters Patent, is—

1. In an electric signaling system for elevators, the combination of a source of electric energy, a rectilinear sectional bare conductor, said sections being insulated from each other and disposed in definite relationship to the several floors of the building containing the elevator, a moving elevator-car carrying an electric signal device electrically connected to one side of the source of electric energy throughout the movement of the car from top to bottom, or vice versa, a trolley device electrically connected to the signal device and moving synchronously with said car and contacting with the sectional conductor, and a key with connecting-wires to establish electrical connection with the other side of the source of electric energy and one of said sections, whereby when the trolley device engages said section the circuit is closed through the signal device.

2. In an electric signaling system for elevators, the combination of a source of electric energy, a rectilinear bare conductor composed of a series of sections electrically insulated from each other and disposed in definite relationship to the several floors of the building containing the elevator, signaling-keys or switches on the respective floors, one terminal of each being electrically connected to one of said sections and the other terminal to one of the sides of the source of electric energy, an elevator-car carrying an electrical signaling device electrically connected to one of the sides of the said source of electric energy throughout the movement of the car from top to bottom, or vice versa, and a trolley device moving synchronously with the car and contacting with said sectional conductor, said trolley device being electrically connected to the signaling device on the car.

3. In an electric signaling system for elevators, the combination of a source of electric energy, an electric signal device carried by a movable car, two terminals on the car directly and permanently connected respectively to the positive and negative sides of said source of electric energy, a switch for electrically connecting said signal device with either of said terminals, a rectilinear bare conductor composed of a series of sections insulated from each other and disposed in definite relation to the several floors of the building containing the elevator, a contact device electrically connected to the signal on the car and engaging said sectional conductor, and moving synchronously with the car, and a circuit-controlling key on each floor operative to establish electric connection between one of said sections of the bare conductor and the side of the source of electric energy opposite to that with which the signal on the car is connected, whereby when the contact device engages such section the circuit will be closed through the signal on the car.

4. In an electric signaling system for elevators, the combination of a source of electric energy, an electric signal device carried by a movable car, two terminals on the car directly and permanently connected respectively to the positive and negative sides of said source of electric energy, a switch for electrically connecting said signal device with either of said terminals, a rectilinear bare conductor composed of a series of sections insulated from each other and disposed in definite relation to the several floors of the building containing the elevator, a contact device electrically connected to the signal on the car and engaging said sectional conductor, and moving synchronously with the car, a circuit-controlling key on each floor operative to establish electric connection between one of said sections of the bare conductor and the side of the source of electric energy opposite to that with which the signal on the car is connected, whereby when the contact device engages such section the circuit will be closed through the signal on the car, and devices to automatically operate the switch on the car when the latter arrives at the terminus of its path of movement in either direction.

5. In an electric signaling system for elevators, the combination of a source of electric energy, an electric signal device carried by a movable elevator-car, a series of stationary "up" signaling-keys or switches, and a series of stationary "down" signaling-keys or switches, all the "up" keys being connected to one side, and all the "down" keys to the other side of said source of energy, a rectilinear sectional electric conductor, the sections of which are insulated from each other and disposed in definite relationship to the several floors of the buiding containing the elevator and a trolley device movable on said conductor for establishing electric connection between the said signal device on the car and the said stationary signaling-keys, two terminals on the car directly and permanently connected respectively to the positive and negative sides of said source of electric energy, and a pole-changing switch on the car included in the signal-circuit for making a connection to either side of said source of energy, according to the kind of signal ("up" or "down") required to be received by said signal device.

6. In an electric signaling system for elevators, the combination of a source of electric energy, an electric signal device carried by a movable car, two terminals on the car directly and permanently connected respectively to the positive and negative sides of said source of electric energy, a switch for electrically connecting said signal with either of said terminals, a rectilinear bare conductor composed of a series of sections electrically insulated from each other and disposed in definite relationship to the several floors of the building containing the elevator, an "up" signaling-key on each floor having one of its terminals electrically connected to one side of the source of electric energy and its other terminal with one of said sections, a "down" signaling-key on each floor having one of its terminals electrically connected to the other side of the source of electric energy and its other terminal with another of said sections, and a contact device to engage said sections, said contact device being electrically connected to the signal device and movable synchronously with the car.

7. In an electric signaling system for elevators, the combination of an elevator-car movable in an elevator-shaft, an electric signal device on said elevator-car, a source of electric energy to one side of which the signal device is connected throughout the movement of the car from top to bottom, or vice versa, a single sectional electric conductor arranged parallel with and in close proximity to the rectilinearly-moving actuating mechanism of the elevator-car, the sections of which conductor are disposed in definite relationship to the several floors of the building containing the elevator, a trolley device moving synchronously with said car and adapted by such movement to contact with the various sections of said conductor and also electrically connected with said signal device or devices, and a series of "up" and a series of "down" signaling-keys or switches and wires adapted to connect said signal device with the other side of said source of electric energy through one of the sections of said sectional conductor and the said trolley device, and a pole-changing switch for rendering operative either the "down" or the "up" series of said signaling-keys according as the said elevator-car is moving "down" or "up."

FRANCIS K. FASSETT.

Witnesses:
F. B. ADAM,
H. ADAM.